L. WENCHEL.
Manufacture of Rotary Cutters for Molding.
No. 217,182. Patented July 1, 1879.
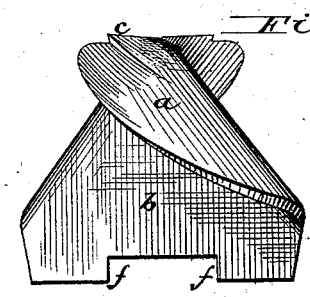
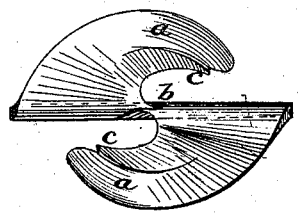
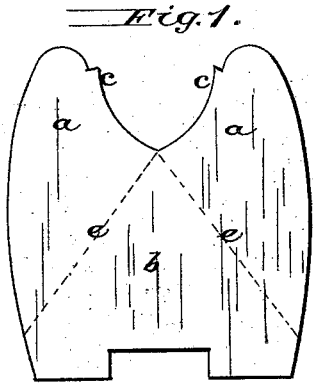
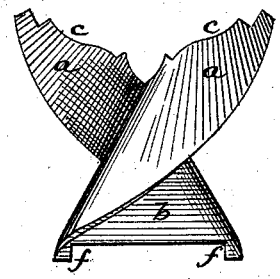
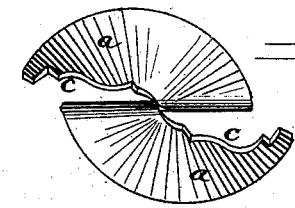
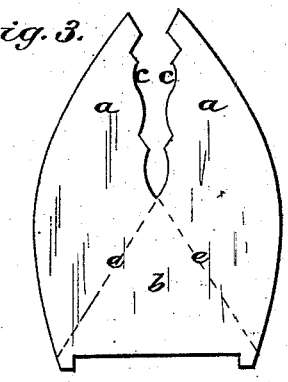
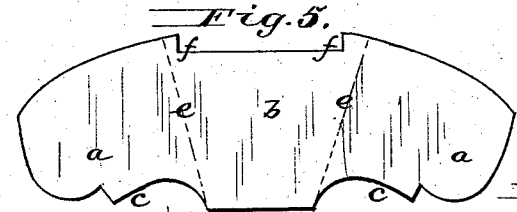
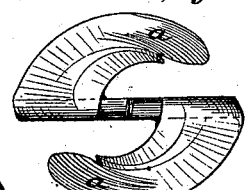

UNITED STATES PATENT OFFICE.

LAURENCE WENCHEL, OF BALTIMORE, MARYLAND.

IMPROVEMENT IN MANUFACTURE OF ROTARY CUTTERS FOR MOLDINGS.

Specification forming part of Letters Patent No. 217,182, dated July 1, 1879; application filed April 23, 1879.

*To all whom it may concern:*

Be it known that I, LAURENCE WENCHEL, of Baltimore, in the county of Baltimore and State of Maryland, have invented certain new and useful Improvements in the Manufacture of Rotary Cutters for Molding-Machines, of which the following is a specification.

The invention embraced in this patent relates to the manufacture of rotary cutters adapted for sinking panels, rosette-cutting, and edge-molding in machines in which a vertical spindle is used.

In a patent bearing even date herewith for certain improvements in molding-machines, I have described and shown a sheet-steel cutter having inclined cutting-wings of peculiar form adapted for such work. My present invention embraces a new method of producing such cutters from sheet-steel, and the device by which they are formed ready to have the cutting-edge.

Referring to the drawings, Figure 1 represents the blank for a panel-sinking cutter; Fig. 2, side and top views of such cutters finished; Fig. 3, the blank for a rosette-forming cutter; Fig. 4, side and top views of such cutter finished; Fig. 5, the blank for an edge-molding cutter; Fig. 6, a top view of a cutter having a straight cross part between the wings; Fig. 7, a side view of the former or bisected cone-anvil upon which the cutting-wings are formed; Fig. 8, a cross-section of the same; and Fig. 9 shows a semi-cone anvil for the same purpose.

The cutter is applicable to molding-machines having a vertical spindle. It is made from a blank of sheet-steel of suitable and uniform thickness, cut with the form of the desired cutting-edge, as shown in the blanks, for the different forms of cutters, and in which $a\ a$ will form the cutting-wings, $b$ the integral shank, and $c\ c$ the cutting-edge in the finished cutter, wherein the cutting-wings will stand out in curved or angular reverse position to each other on opposite sides of the shank $b$, and in inclined positions with respect to said shank upon the dotted lines $e\ e$, leaving the shank of triangular form, or nearly so, over which the cutting-wings extend with a greater or less curve or angular projection. The cutting edge or edges and the wings will have a curve or angle corresponding to that part of the surface of the cone or pyramid over which it is formed, as shown in the drawings, and the cutting-edge will thereby diverge from or near the middle of the cutter, and of such form as to give a much longer cutting-edge than the width of the molding which it is intended to produce. This form is for panel-sinking and rosette-cutting, and is produced upon the cone-former at or near its apex, while the wings for an edge-molding cutter have the shape and form corresponding to that portion of the cone-former at or near its base.

The device which I employ in the manufacture of my cutter consists of a cone, anvil, or vise, bisected vertically, the two sections A and B being adapted for adjustment to part or open the line of the split, and leaving a space, $f$, between their flat sides to receive the blank with its cutter-forming edge upward, and the middle of the blank in line with the point at which the bisected cones cross each other. That part of the blank which projects over the flat sides of each section of the cone is bent over the conical sides of the respective sections to form the cutting-wings $a\ a$ by swaging with a hand-hammer, so that each wing will have a form corresponding to the cone or pyramidal sections and to that part over which the wings are formed, said wings being turned in opposite directions in being thus formed upon the triangular shank $b$, which is clamped in the space between the sections. Before being thus clamped and formed the blank is properly heated, and after being thus formed it is removed, the cutting-edges formed, and the cutter properly tempered for use. In this way cutters of different sizes and for different kinds of work are made upon the bisected cone-anvil or pyramidal former by adjusting its sections to give the wings the desired curve or angle by forming the wings at points nearer to or farther from the apices of the shifted cone-sections. Right and left cutters may also be formed in this way by shifting the cone-sections to the right or to the left. Any suitable means may be employed for clamping the cone or angular sections together. A strip or plate of the desired width is inserted in the blank-holding space between the flat faces of the cone-sections to gage the position of the blank with respect to the apices of the cones to suit the desired cutter, as in Fig. 8. In some forms of cutters, in which the wings extend from the shank in comparatively straight lines for panel-sinking, I use a semi-cone anvil and form the wings with the cutting-edge standing toward the base of the former, as shown in Fig. 9, and with this semi-cone or a semi-pyramid I can make the cutters with the wings having different forms and curves or angles, and with the cutting-edge standing upward. In this semi-cone any suitable means may be used for clamping the blank in place to form the wings alike, and, whatever the position of the blank, the wings, when formed, will be the counterpart of that part of the conical surface over which it is swaged.

The cutting-edge is formed upon the wings by turning down the edges in a lathe and afterward dressing them properly both inside and outside. The form of the wings at their points gives a free clearance back of the cutting-edge, and the space between the wings and the shank allows the shavings to pass freely out.

In sinking panels and for rosette-cutting the cutting-edge extends from the point of one wing to the point of the other, giving a full sweep and continuous planing-cut; but for edge-molding the cutting-wings act in succession, the cutting-edge being interrupted by the holder; but, whatever the style of the molding, the cutters have the same construction, are made upon the same former, applied in the same way, and operate with a holding and feeding function upon the work and leave it smooth and true, whether cutting with or against the grain of the wood.

The panel-sinking cutter (shown in Fig. 2) has the shape, in blank, somewhat of a heart, the points $a$ $a$ of which, when formed upon the cone-surface upon the inclined lines $e$ $e$, form a continuous cutting-edge, at right angles to the axis of the spindle, to reduce the flat part of the panel between the moldings.

The rosette-cutter (shown in Fig. 4) has the shape, in blank, of a cone bisected from the apex to the point of the dotted triangle and the points when formed upon the cone-surface upon the inclined lines $e$ $e$, forming a continuous cutting-edge, rising and curving from the point of said triangle to the ends of the wings. In the edge-molding cutter the wings stand out from the flat shank, as shown in Fig. 5, and the cutting-edge does not cross said shank.

I have described and shown cutters formed from a blank of sheet-steel integral with a flat shank; but it is obvious that the same method of forming the cutter and the same former may be used to form cutting-wings separate from a connecting-shank, but having an inclined shank portion for bolting it to a suitable holder, without departing from the method of manufacturing my said cutter. In reverse, curved, or angular cutters having the joining-shanks, such shanks are provided with shoulders $f$ $f$ at or near the angles of the base, by which it is securely seated within a cross-slit in the holder, as shown in my patent referred to.

I claim—

1. The method of manufacturing rotary cutters for molding-machines, substantially as herein set forth, which consists in cutting a blank of sheet-steel of the desired form and size, and then forming the cutting-wings over a conical or pyramidal surface of a former to give the wings an inclined and spiral concave form, and afterward tempering and giving the cutting-edge, substantially as herein set forth.

2. For the manufacture of rotary cutters for molding-machines from blanks of sheet-steel, the bisected cone or pyramidal former, adapted for adjustment and to hold the blank in proper position to form thereon the reverse cutting-wings, substantially as herein set forth.

In testimony whereof I have hereunto set my hand in the presence of two witnesses.

LAURENCE WENCHEL.

Witnesses:
    JOHN B. PUNT,
    JOHN F. WENCHEL.